UNITED STATES PATENT OFFICE.

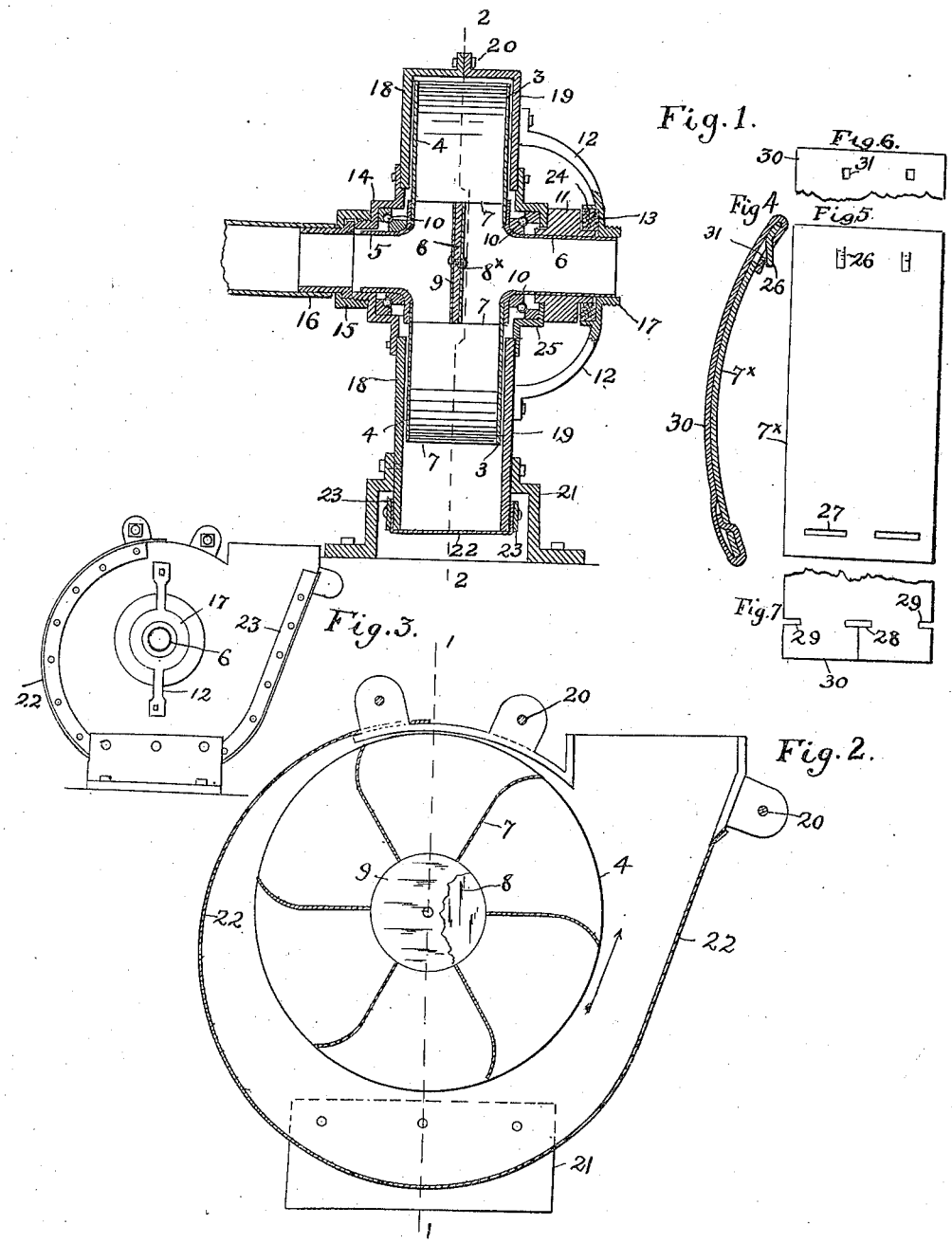

JOHN T. SKILLINS AND GEORGE A. GABRIEL, OF WESTBROOK, MAINE, ASSIGNORS TO DANA COTTON HARVESTER COMPANY, OF WESTBROOK, MAINE, A CORPORATION OF MAINE.

CENTRIFUGAL FAN.

1,319,364.   Specification of Letters Patent.   Patented Oct. 21, 1919.

Application filed December 19, 1918. Serial No. 267,443.

*To all whom it may concern:*

Be it known that we, JOHN T. SKILLINS and GEORGE A. GABRIEL, citizens of the United States, residing at Westbrook, in the county of Cumberland and State of Maine, have invented certain new and useful Improvements in Centrifugal Fans, of which the following is a specification.

Our invention relates to centrifugal fans and it is designed especially to be used in a pneumatic cotton picking machine where the cotton from the boll is drawn through a hose and an exhaust nozzle and, passing through the fan, is discharged into a suitable conveyer.

The fans hitherto used in such machines have had a tendency to clog up owing to the bulky nature of the cotton and the great velocity of the fan has had a tendency to break the seeds of the cotton where they came in contact with the blades of the fan and the inside surface of the casing.

The object of our invention is to produce a fan of simple construction which will produce as much vacuum as possible and will discharge the cotton at a high velocity without clogging the fan or fracturing the hulls of the cotton seeds.

According to our invention, we construct a fan having a central inlet at each side and a tangential outlet with the rotor mounted on a hollow shaft so that the incoming air will be delivered through the shaft at the exact center of the rotor.

A central diaphragm separates the two incoming columns of air and directs each outwardly between the blades of the rotor.

The periphery of the casing is made of cushioning material as rubber or woven fabric or has a lining of such material, so that as the cotton is thrown against it by the centrifugal motion of the rotor, the seeds will not be ruptured and broken.

Thus the incoming cotton and air are delivered at the center of the rotor and first come in contact with the inner edges of the blades where there is the least velocity and is the least likelihood of their breaking the seeds. The velocity gradually increases toward the periphery of the fan and when the cotton is driven against the inside surface of the casing, which it is with considerable force, it strikes against the cushioning or flexible material of which the periphery of the casing is formed and passes out through the tangential opening without damage.

The two incoming currents of air are separated by a diaphragm in the center of the fan and occupying the space within the inner edges of the rotor blades.

In the accompanying drawing, we have illustrated a centrifugal fan constructed according to our invention, but it is evident that numerous changes may be made in the design without departing from the spirit of the invention as expressed in the appended claims.

Referring to the drawing:

Figure 1 represents a central vertical section taken on the line 1—1 of Fig. 2.

Fig. 2 is a section taken on the line 2—2 of Fig. 1.

Fig. 3 is a side elevation of the fan on a reduced scale.

Fig. 4 is a longitudinal section of one of the fan blades showing a cushioning covering.

Fig. 5 is an elevation of the uncovered blade.

Fig. 6 is a view of one of the ends of the covering strips and,

Fig. 7 is the opposite end of the same.

The fan is made up of the usual rotor revolving in a spiral casing and having a hollow shaft each end of which is connected with a line of hose.

As here shown, the rotor is made up of a pair of annular side disks 3 and 4 each of which is secured to the inner end of a short section of hollow shaft.

The disk 4 connects with the inner end of the hollow shaft 5, and the disk 3 connects with the inner end of the hollow shaft 6 by means of suitable flanges formed on the inner ends of these hollow shafts.

Between the side plates 3 and 4 are secured the blades 7 of the fan suitably curved to produce a current of air of the greatest possible velocity.

To separate the two incoming air currents, we insert a central diaphragm 8 which is here shown as a disk occupying the entire space inside of the inner edges of the blades 7.

This diaphragm is located half way between the inner ends of the hollow shafts and is secured to the inner ends of the blade by soldering or otherwise.

The two opposite faces of the diaphragm may be covered with fabricated rubber or other cushioning material as 9, to break the shock of the cotton seeds as they are drawn through the hollow shaft. The disk 9 of covering material is secured centrally to the disk 8 by a central bolt or rivet 8×, the outer edges of the disk being left free. The centrifugal motion of the disks will hold them in place and give additional resiliency to the surface.

The hollow casing is made of two side plates 18 and 19 secured together by bolts 20. The casing is made in the usual spiral form and the central portion is made up of the two hollow hubs 14 and 25, each of these hubs being provided with an outwardly extending flange which is bolted to the inner portion of the side plates of the casing. The hollow portion of the hub 14 is so formed as to leave an annular space between it and the inner end of the shaft 5 and in this space is inserted a suitable ball bearing 10.

The central portion of the hub extends outward longitudinally of the shaft and is provided with a screw thread which engages a hose coupling 15 connected with a length of hose 16.

The outer end of the hollow shaft 5 fits loosely in the hollow hub 14.

On the opposite side of the fan the hollow hub 25 is bolted to the side plate 19 and forms an annular recess outside of the flange of the hollow shaft 6 in which recess is inserted a suitable ball bearing 10.

On the hollow shaft 6 and immediately outside of the hub 25 is secured a pulley 11 and outside of the pulley 11 is the hollow hub 17 into which fits loosely the outer end of the shaft 6.

The hub 17 is screw threaded to receive a hose coupling similar to that shown on the other side of the fan and an annular rib 24 is formed on the inside of the hub 17.

A felt packing ring 13 is inserted between the hub 17 and the outer face of the pulley and is held in place by the annular flange 24. The packing ring excludes the air from the outer end of the hollow shaft 6.

Curved arms 12 secure the hub 17 to the casing.

As shown, the casing is supported by suitable foot pieces 21 secured to the lower end of the casing and bolted to a foundation. As herein shown, the two halves of the casing are joined together by a strip 22 preferably of fabricated rubber which has a yielding or cushioning surface that tends to break the shock of the cotton seed as it is thrown outward by the rotor. The edges of the strip 22 are drawn over the edges of the casing and secured in place by metal fastening strips 23 held to the casing by suitable bolts or rivets.

An equivalent construction would be the lining of the ordinary fan with some cushioning material although the present construction insures a much greater cushioning effect. In the preferred form of our device the blades of the fan as well as the central diaphragm are covered with cushioning material.

In Figs. 4, 5, 6 and 7, we have illustrated an easy method of covering the blade without the use of bolts or rivets.

One of the blades as 7× curved from end to end has a pair of transverse slots 27 cut near one end in line with each other and separated in the center of the blade. Near the opposite end of the blade a pair of tongues 26 are struck from the metal of the blade and extend on the concave side of the blade.

A strip of raw hide or other flexible material 30 is cut the same width as the blade and somewhat longer. At one end of the strip are cut in from each edge a pair of slots 29 in depth corresponding to the distance from the outer end of the slot 27 to the edge of the blade. A slot 28 is cut in the center of the strip in line with the slots 29 and in length corresponding with the space between the slots 27. At the opposite end of the strip 30 are cut two openings 31 in line longitudinally with the tongues 26. From the center of the slot 28 the material is cut in a straight line to the end of the strip.

In applying the raw hide to the blade each half the strip from the slots 29, 28 to the end is tucked through one of the slots 27 in the blade from the concave side of the blade outward. This can be done as the material is very pliable and somewhat thinner than the width of the slot 27. The raw hide is then drawn around the end of the blade as shown in Fig. 4 and thence around the other or outer end of the blade to the concave side where the openings 31 are hooked over the tongues 26.

In the operation of this blower the air and cotton are drawn in through the hollow shaft against the diaphragm 8 and thence pass out through the blades and the casing.

Thus the two currents do not conflict with each other and each passes unobstructed to the blades of the fan.

An eddy or cushion of air tends to form next to the surface of the diaphragm 8 and even when the surface is uncovered the cotton seeds are thus prevented from striking squarely against the surface of the diaphragm and becoming ruptured.

As the air and cotton pass outward from the center, they first come into contact with the blades where the latter have the least velocity and the velocity is gradually increased to the outer edge of the rotor.

Thus our centrifugal fan may be speeded up to a high velocity without the rupture of the cotton seed, and its construction is such that it produces a high degree of vacuum.

The use of the hollow shaft leaves the central portion of the fan unobstructed so that there is no tendency of the cotton to clog as there might be if a solid shaft were to be used.

If there is any tendency to clog on either side before the fans are reached, the vacuum on the opposite side tends to break down the obstruction.

Our fan is admirably adapted to small sizes such as are used on a cotton picking machine where the fan is mounted on a truck which is hauled between the rows of cotton. The lines of hose will lead laterally from the fan in both directions and any number of fans may be used on each machine.

In practice we propose to use two or three of these fans on each cotton harvester giving four or six lines of hose and picking nozzles operating at the sides of the machine.

It is evident that a single hollow shaft may be used extending from one side of the casing to the other with openings in the center instead of the hollow shaft made in two sections although by the construction shown, the center is left entirely free for the passage of the cotton outward to the blades.

The blades may be of any desired number governed by the speed of the fan.

Any tendency of the seeds to break on coming in contact with the blades is neutralized by the cushioning covering above shown or by any similar covering.

We claim:

1. In a centrifugal fan, the combination of a casing having a tangential outlet, a bearing at each side of said casing, a hollow shaft in each of said bearings, a rotor connecting the inner ends of said hollow shaft having fan blades and a central diaphragm inside of said blades for separating the two incoming air currents.

2. In a centrifugal fan, the combination of a casing having a tangential discharge outlet, a bearing on each side of said casing, a hollow shaft journaled in each of said bearings, a rotor disk secured to the inner end of each of said shafts, blades secured between said disks and a central diaphragm filling the space inside of said blades.

3. In a centrifugal fan, the combination of a casing having a tangential outlet, a bearing at each side of said casing, a hollow shaft journaled in each of said bearings, a rotor connecting the inner ends of said hollow shaft having fan blades and a central diaphragm inside of said blades for separating the two incoming air currents, said diaphragm having its two surfaces covered with cushioning material.

4. In a centrifugal fan, the combination of a casing having a tangential outlet, a hollow shaft extending through said casing, a rotor secured to said hollow shaft and a central diaphragm inside the blades for separating the incoming columns of air.

5. In a centrifugal fan, the combination of a casing having a tangential outlet and a central inlet, the periphery of said casing being formed of a strip of flexible material secured by its two lateral edges to the casing and a rotor within said casing.

6. In a centrifugal fan, a casing having a tangential outlet and a central inlet, said casing being composed of a pair of side plates with a strip of flexible material uniting the edges of said side plates and forming the periphery of said casing and means for securing the edges of said strip to said side plates.

7. In a centrifugal fan, the combination of a casing having a tangential outlet and a central inlet, a rotor within said casing said casing being formed by a pair of side plates, a strip of flexible material uniting the edges of said side plates and forming the periphery of said casing and overlapping the edges of said side plates and fastening rings for securing the edges of said strip to said side plates.

8. In a centrifugal fan for blowing raw cotton, a blade having at one end transverse slots and at the other end struck-up hooks or tongues, a strip of resilient material having openings at one end and cut at the other end to be inserted through said slots and to interlock therewith, said strip being drawn around the end of the blade, thence over its working surface and around the opposite end, said openings hooking over said tongues to secure the strip in place.

9. In a centrifugal fan for blowing raw cotton, a blade having at one end transverse slots and at the other end struck-up hooks or tongues, a strip of resilient material having openings at one end and cut at the other end to be inserted through said slots and to interlock therewith, said strip being drawn around the end of the blade, thence over its working surface and around the opposite end and means for fastening said last mentioned end to the blade.

In testimony whereof we affix our signatures.

JOHN T. SKILLINS.
GEORGE A. GABRIEL.

Copies of this patent may be obtained for five cents each, by addressing the "Commissioner of Patents, Washington, D. C."